(12) United States Patent
Moran, III

(10) Patent No.: US 6,588,723 B1
(45) Date of Patent: Jul. 8, 2003

(54) DECORATIVELY AESTHETIC SHEPHERD HOOK

(75) Inventor: Joseph P. Moran, III, Tulsa, OK (US)

(73) Assignee: CFM Corporation, Ontario (CA)

( * ) Notice: Subject to any disclaimer, the term of this patent is extended or adjusted under 35 U.S.C. 154(b) by 0 days.

(21) Appl. No.: 09/608,382

(22) Filed: Jun. 30, 2000

(51) Int. Cl.[7] ............................................. F16M 13/00
(52) U.S. Cl. ........................ 248/530; 248/156; 248/175
(58) Field of Search ............................. 248/530, 156, 248/175, 125.8; 47/70, 47; 256/1, 19, 59

(56) References Cited

U.S. PATENT DOCUMENTS

| | | | | | |
|---|---|---|---|---|---|
| 2,450,345 | A | * | 9/1948 | Kervin | ........................ 52/301 |
| 3,740,024 | A | * | 6/1973 | Hellerich et al. | ............. 256/19 |
| 3,828,373 | A | * | 8/1974 | Fraley | ................... 248/156 X |
| 3,995,796 | A | | 12/1976 | Kline | |
| 4,170,088 | A | * | 10/1979 | Fritz et al. | ...................... 47/47 |
| 4,189,356 | A | | 2/1980 | Merony et al. | |
| 4,343,567 | A | * | 8/1982 | Sarver et al. | |
| 4,451,340 | A | | 5/1984 | Ginatta | |
| 4,691,884 | A | * | 9/1987 | Parduhn | ................. 248/156 X |
| 4,779,375 | A | * | 10/1988 | Harder | ........................... 47/47 |
| 4,805,292 | A | | 2/1989 | Noguchi | |
| 4,833,566 | A | * | 5/1989 | Nickola | |
| 4,938,446 | A | * | 7/1990 | Williams | ..................... 248/530 |
| 4,961,258 | A | * | 10/1990 | Menzel | ........................ 156/264 |
| 4,986,067 | A | | 1/1991 | Caccialupi | |
| 5,141,207 | A | * | 8/1992 | Meglino et al. | ................. 256/1 |
| D331,526 | S | * | 12/1992 | Miller | ............................ D8/1 |
| 5,323,583 | A | * | 6/1994 | Venegas, Jr. | .................... 256/1 |
| 5,332,196 | A | * | 7/1994 | Wright | ........................ 116/173 |
| 5,657,886 | A | * | 8/1997 | Tacchella | ..................... 150/154 |
| 5,678,365 | A | * | 10/1997 | Venegas, Jr. | ................ 256/13.1 |
| D392,853 | S | * | 3/1998 | Hardison | ................. D6/403 X |
| 5,765,285 | A | | 6/1998 | Buy et al. | |
| 5,816,558 | A | | 10/1998 | Sommer et al. | |
| 5,826,843 | A | * | 10/1998 | Sturm | ......................... 248/175 |
| 5,924,667 | A | | 7/1999 | Grahn et al. | |

FOREIGN PATENT DOCUMENTS

JP 57-120696 7/1982 ........... C25D/17/08

OTHER PUBLICATIONS

6381 Flower Bell & Stake, p. 36, David Kay 1990 Spring/Summer Catalog.*

* cited by examiner

*Primary Examiner*—Korie Chan
(74) *Attorney, Agent, or Firm*—Baniak Pine & Gannon

(57) ABSTRACT

A shepherd hook is provided with a decorative outer cladding, preferably copper tube. The end of the outer decorative tubing is flattened and upturned to hold a decorative hanging basket or other decoration from an upturned lip.

11 Claims, 1 Drawing Sheet

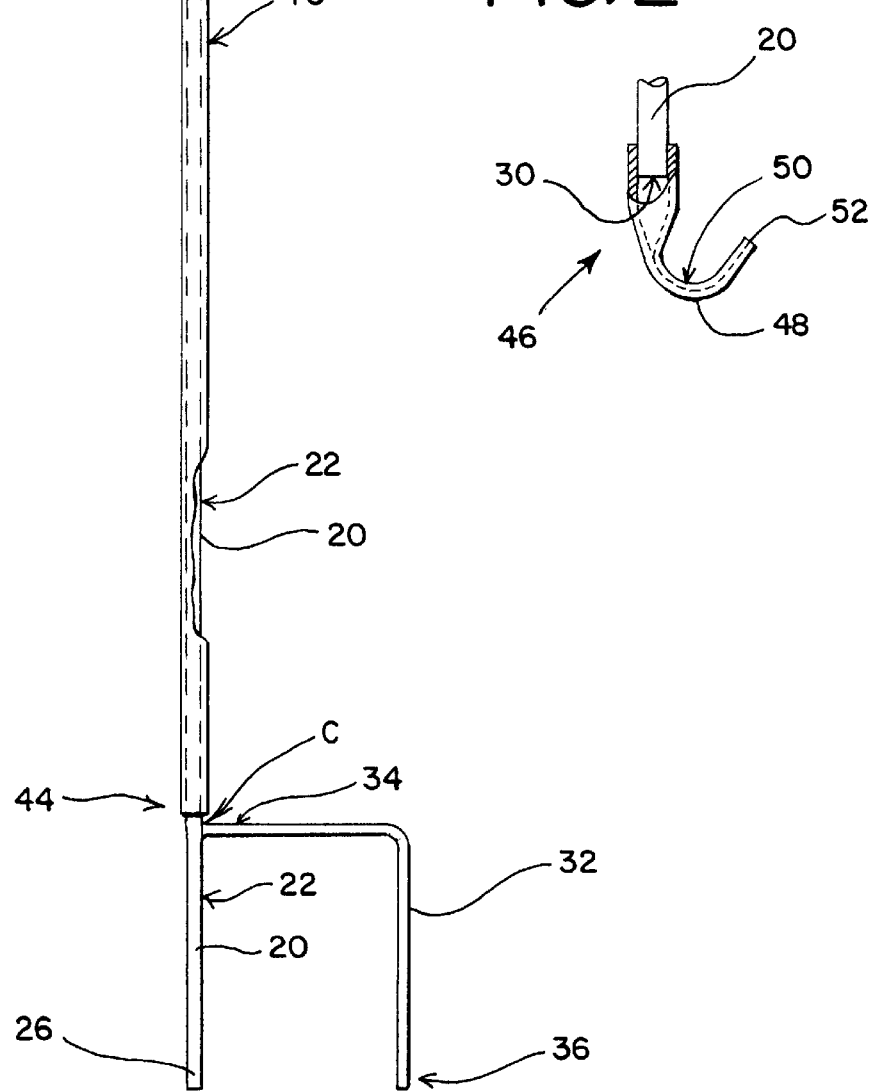

DECORATIVELY AESTHETIC SHEPHERD HOOK

BACKGROUND OF THE INVENTION

1. Field of the Invention

This invention pertains to decorative hooks for hanging flower baskets, bird feeders and the like, and more particularly to a shepherd hook having a decorative outer cladding.

2. Discussion of the Prior Art

There are many types of hooks available for hanging decorative flower baskets and in particular, one of the most popular types of hook is what is known as the shepherd hook. This type of hook is easily identified by its rather substantially long staff, which is provided with a large rolling hook formation on one of its ends. This type of hook has been used since early biblical times for various purposes by sheep herders, but in recent times has been adapted for insertion into the ground so that plants, decorative baskets of flowers, wreaths, bird feeders, wind chimes, bug zappers and other holiday ornamental items can be suspended from the hook portion as a means for decoratively enhancing a patio, entranceway, etc. of a homeowners property.

One of the problems with the shepherd hooks that are available, is that although they are used for decorating within the landscaping arts, they themselves are rather bland in decorative appeal in that there is generally only one choice of material in which they are available: steel. Therefore, there is a need for a shepherd hook which has greater aesthetic value in order to enhance its role in decoratively improving the landscaping of a users home, etc.

SUMMARY OF THE INVENTION

The present invention has a principal aspect of providing a decorative shepherd hook that is aesthetically pleasing and which comprises a first member having a preferably cylindrical shape with an outside surface extending between a first and second end and a second hollow preferably cylindrical member concentrically arranged preferably in close contact against the outside surface of the first member. Most preferably, the second member has first and second ends generally corresponding to the first and second ends of the first member.

In another aspect of the invention, the respective second ends of the first and second members are formed as a downwardly depending U-shaped hook portions.

In yet another aspect of the invention, the second end of the second member includes a tip, the tip formed as an upturned lip.

In still another aspect of the invention, the upturned lip is planar and has a semi-circular shape that is formed by compressing the hollow member so that it has a planar configuration.

In a preferred embodiment of the invention, the second member is comprised of copper tube, surrounding a first member in the form of a steel rod. The first member may also be a rod formed of other materials of sufficient strength and rigidity.

The features and advantages of the invention will be further understood upon consideration of the following detailed description of an embodiment of the invention taken in conjunction with the drawings, in which:

BRIEF DESCRIPTION OF THE DRAWINGS

FIG. 1 is a side view in partial cross section of a shepherd hook made in accordance with the present invention;

FIG. 2 is a detailed view of a tip of the hook shown in FIG. 1.

DETAILED DESCRIPTION OF A PREFERRED EMBODIMENT

Turning to FIGS. 1 and 2, an embodiment of the present invention 10 will now be described in greater detail. As seen, the shepherd hook 10 of the present invention is comprised of a first member 20 which is formed from steel bar stock having a circular cross section. Member 20 has a first end 24 and a second end 26 and an outside surface 22. The member 20 is rather elongated, as defined between the extent existing between ends 24 and 26, therefore, it is preferable that member 20 be formed of steel or of another material which can counter the bending stresses which the hook 10 will encounter when it is loaded. The second end of rod member 20 is configured into a downwardly depending U-shaped, or hook shaped portion 28, that is defined by the radius 29, hence providing the shepherd hook appearance. The end of the hook shaped portion 28 terminates with an end surface 30. On the lower part of first member 20, an L-shaped member 32 is integrally attached at a point vertically upward from first end 24. The L-shaped member includes a first end 34 which is attached to rod member 20 at a point C, as by welding. The second end 36 is located on a same horizontal plane as first end 24 of rod member 20. The L-shaped member is formed of a solid rod, such as one having the same diameter as the first member and comprised of the same material.

A second hollow cylindrical member identified herein at 40 is seen encasing the first rod member 20 and it represents a decorative outer finish or cladding to the shepherd hook. The second member 40 has an inside diameter 41 that is dimensioned such that when member 40 concentrically receives the first member 20 therein, the outside surface of member 20 forms a close fit between the combined members. The second hollow cylindrical member 40 includes a first end 44 disposed a small distance above the connection point C and the L-shaped member 32. The second end 46 also has a complementary formation as the first member, that being U-shaped.

In FIG. 2, it is seen that the second end 46 of the second member 40 extends slightly beyond the end surface 30 of the first rod member 20, terminating in tip or part 48. The tip is formed by compressing or flattening the normally circular outside wall surface 42 so that the cylindrical member now forms a planar wall configuration, rather than the previously hollow configuration. The tip 48 is also upturned in a semicircular fashion such that an interior surface 50 is presented within the tip 48. The interior surface 50 functions to support any type of hanging flower basket arrangement via a hook or suspended line that is attached to a basket to be hung (not shown).

Instead of using copper tubing to construct the second member 40, stainless steel, brushed aluminum, or some other decorative cladding could be used.

The shepherd hook 10 of this embodiment is formed by first providing a first member 20 that does not have a U-shaped or hook shaped second end, although the L-shaped member will be attached. In this way, a straight section of tubing (the second member) can be either slid over the first member, or the first member can be inserted into the second member. The tubing is of a pre-determined extent where the end 44 rests proximate the connection point "C" and where end 46 slightly extends past end surface 30. The composite member is then subjected to a bending process where both second ends 24, 46 are formed into the U-shaped configuration seen in FIG. 1. This process causes the first end 44 of the second member 40 to lift from the point "C" as shown in FIG. 1. The tip 48 is then subjected to a pressing operation to flatten the tubing. An optional stamping operation could be performed on tip 48 to form a decorative design in the tubing. Then, the tip is subjected to a second bending operation where the upturned lip is formed therein.

While the apparatus and method herein disclosed forms a preferred embodiment of this invention, this invention is not limited to that specific apparatus and method, and changes can be made therein without departing from the scope of this invention which is defined in the appended claims.

What is claimed is:

1. A device for hanging objects therefrom, comprising:
   a first elongated member, the first elongated member having an upper end and a lower end;
   a downwardly depending U-shaped hook portion, the downwardly depending U-shaped hook portion extending from the upper end of the first elongated member; and
   a second elongated hollow member, the second elongated hollow member having an upper end, being concentrically arranged about a substantial portion of both the first elongated member and the downwardly depending U-shaped hook portion and terminating in an upturned part extending from the upper end of the second elongated hollow member.

2. The device of claim 1, wherein the upturned part is planar and comprises a semi-circular shape in the form of a compressed part of the second elongated hollow member.

3. The device of claim 2, wherein the upturned part extends beyond the upper end of the first elongated member.

4. The device of claim 3, wherein the lower end of the first elongated member includes an L-shaped member integrally attached thereto, adapted to be inserted into the ground.

5. The device of claim 1, wherein the first elongated member is a solid cylindrical bar formed of steel.

6. The device of claim 1, wherein the second elongated hollow member is comprised of a cylindrical copper tube.

7. A device for hanging objects therefrom, comprising:
   an elongated rod, the elongated rod having an upper end, a lower end and a radius, the upper and lower ends defining a length of the elongated rod;
   a cylindrical tube covering the elongated rod concentrically and over substantially the entire length of the elongated rod, the cylindrical tube having an upper end, a lower end and an inside diameter; and
   the radius and the inside diameter being dimensioned to provide a close fit between the elongated rod and the cylindrical tube;
   wherein the upper end of the cylindrical tube ends in an upturned lip.

8. A process for the production of an ornamental shepherd hook, comprising:
   providing a cylindrical tube having an inside diameter;
   providing an elongated rod having a radius, the radius being complementary with the inside diameter of the cylindrical tube, the elongated rod being slideably receivable within the cylindrical tube;
   placing the elongated rod within the cylindrical tube to form a combined member;
   forming one end of the combined member into a downwardly depending hook-shaped portion; and
   forming one end of the cylindrical tube into an upturned part.

9. The process of claim 8, further comprising:
   forming the elongated rod of steel; and
   forming the cylindrical tube of copper.

10. The process of claim 8, further comprising:
    extending the downwardly depending hook-shaped portion beyond the end of the elongated rod; and
    forming a semicircularly shaped lip on the upturned part.

11. The process of claim 10, further comprising flattening the lip.

* * * * *